United States Patent
Ketelsen et al.

[15] 3,690,172
[45] Sept. 12, 1972

[54] MAGNETIC FLOWMETER HAVING FERROUS FIELD ARMATURE

[72] Inventors: Broder Ketelsen, Settmarshausen; Wilfried Kiene, Hedemuenden; Hermann Grosch, Goettingen-Weende, all of Germany

[73] Assignee: Fisher & Porter Company, Warminster, Pa.

[22] Filed: Jan. 29, 1971

[21] Appl. No.: 111,003

[52] U.S. Cl. ................................................73/194 EM
[51] Int. Cl. ..........................G01f 1/00, G01p 5/08
[58] Field of Search ..336/234; 335/297; 73/194 EM; 310/11

[56] References Cited

UNITED STATES PATENTS

| 3,527,095 | 9/1970 | Wada | 73/194 EM |
| 3,176,169 | 3/1965 | Neitzel | 310/11 |
| 2,929,326 | 3/1960 | Ingels | 310/11 X |
| 3,589,186 | 6/1971 | Bourg | 73/194 EM |

FOREIGN PATENTS OR APPLICATIONS

| 798,997 | 11/1968 | Canada | 73/194 EM |

*Primary Examiner*—Charles A. Ruehl
*Attorney*—Michael Ebert

[57] ABSTRACT

A magnetic flowmeter for measuring volumetric fluid flow rates, the meter including a pair of electrodes disposed at diametrically opposed points in a non-magnetic pipe section through which the fluid to be measured is conducted. A non-homogeneous magnetic field is established in the pipe section by a laminated ferrous field armature of cylindrical form encircling the pipe section and provided with longitudinally extending slots to accommodate the windings of two field coils symmetrically disposed relative to the electrodes.

4 Claims, 3 Drawing Figures

PATENTED SEP 12 1972  3,690,172

INVENTORS
BRODER KETELSEN
BY WILFRIED KIENE
HERMANN GROSCH

ATTORNEY

MAGNETIC FLOWMETER HAVING FERROUS FIELD ARMATURE

BACKGROUND OF THE INVENTION

This invention relates generally to magnetic flowmeters, and more particularly to a meter having a laminated ferrous field armature.

A magnetic flowmeter is a volumetric fluid flow rate device utilizing the characteristic of a metered fluid to to produce an induced voltage when flowing through a magnetic field. The operation of the meter is based on Faraday's Law of Induction which states that the voltage induced across a conductor as it moves at right angles through a magnetic field is proportional to the velocity thereof.

In a magnetic flowmeter, the fluid to be measured is conducted through a pipe section having a pair of electrodes mounted therein at diametrically opposed points, a magnetic field being generated in a plane perpendicular to the longitudinal axis of the pipe section, which plane includes the transverse axis common to the electrodes. If one considers a segment of the metered fluid as a conductor whose length D is equal to the diameter of the pipe, then as the fluid conductor moves at a velocity V through a magnetic field B, the voltage induced across this conductor in the plane of the meter electrodes will be proportional to the rate of fluid flow.

This may be expressed mathematically by the following equation:

$$E = 1/C\, BVD$$

where $C$ is a dimensionless constant.

By providing a magnetic field B of high strength, a favorable signal-to-noise ratio is obtainable in the output of the flowmeter. The reason for this will be evident from the foregoing equation, in that for a given fluid velocity V, an increase in the strength of the magnetic field B will give rise to an increase in the induced voltage E.

In order, therefore, to increase the magnetic field strength B in relation to the electrical current of the field coils, it is the present practice to place several ferrous field armatures on the exterior of the pipe section in an arrangement wherein the magnetic lines of flux pass therethrough. In this way, sufficient strength. flux can be provided (i.e., generating excessive heat in the field coils. Moreover, by the use of ferrous field armatures, one may obtain a predetermined distribution of electrical flux which is unaffected by external influences otherwise having an adverse effect. spurious It is known for this purpose to provide two saddle-shaped field coils which are symmetrically arranged with respect to the common axis of the meter electrodes. A laminated field armature is arranged to encircle the pipe section within the openings of the saddle-shaped field coils. This armature is constituted either by a band-shaped core wrapped around the field coils and the pipe section, or by straight, blunt, contiguous core components laminated in the same fashion.

Because of the dimensions of the saddle-shaped field coils, the armature core or core parts cannot, at all points, be brought as close as possible to the pipe section. As a consequence, one cannot avoid creating relatively large air gaps which weaken the magnetic return paths, with a resultant loss of magnetic field strength Furthermore, since the magnetic flux is developed and enters into the main plane i.e., the large cross-section) of the band-shaped core or the laminated core parts, eddy currents are produced as well as local saturation in the inner layers of the band core or the core parts. With the usual alternating-current excitation of the field coils, this leads to spruious harmonics in the magnetic flux and also in the measuring signal.

In one prior attempt to overcome these drawbacks, the ferrous field armature is constituted by two E-shaped core components facing one another and arranged symmetrically around the pipe section with respect to the common axis of the electrodes. In this arrangement, each middle leg of the two E-shaped cores is surrounded by a multiple-layer cylindrical field coil. Since both E-shaped core components also have two outer legs, a scatter flux is developed which reduces the signal voltage, for no optimal flux loop is present in the electrode plane of the pipe section.

Also, with this type of field coil, only relatively small current densities are permitted, because of its poor elimination of heat. Hence, energization of the field coils is limited by this factor. A further disadvantage of this known arrangement is its relatively large space requirement in the region perpendicular to the electrode axis, which depends on the height of the cylindrically shaped field coils and the pole shoes. Because of this, the magnetic resistance and the scatter flux are increased, making necessary greater energization.

BRIEF DESCRIPTION OF THE INVENTION

In view of the foregoing, the main object of this invention is to provide a magnetic flowmeter having a ferrous field armature which overcomes the drawbacks of prior arrangements and affords, in conjunction with a pair of field coils, a magnetic field of high strength.

More specifically, it is the object of this invention to provide a laminated ferrous field armature which is cylindrical in form and encircles the pipe section, the armature being symmetrically positioned with respect to the common axis of the electrodes, the smallest cross-section of the laminations lying at right angles to the lines of magnetic flux passing therethrough, thereby minimizing magnetic resistance and avoiding eddy-current effects, as well as effectively dissipating the heat developed by the energized field coil.

Also an object of the invention is to provide a magnetic flowmeter which operates efficiently and reliably.

Briefly stated, these objects are accomplished in a magnetic flowmeter including a pair of electrodes disposed at diametrically opposed points in a non-magnetic pipe section through which the fluid to be measured is conducted, the pipe section being encircled by a laminated ferrous field armature of cylindrical form having longitudinally extending slots which lie in parallel relation to the longitudinal axis of the pipe section and are symmetrically arranged with respect to the electrodes, a pair of field coils being provided, the windings of one coil passing through the slots above the electrode axis, the windings of the other coil passing through the slots below the electrode axis to create a non-homogeneous magnetic field whose lines of flux extend at right angles to the width of the laminations of the armature.

OUTLINE OF THE DRAWING

For a better understanding of the invention, as well as other objects and further features thereof, reference is made to the following detailed description to be read in conjunction with the accompanying drawing, in which:

FIG. 1 is a perspective view of a ferrous field armature in accordance with the invention, surrounding the pipe section of a magnetic flowmeter;

FIG. 2 separately shows the armature; and

FIG. 3 schematically indicates the non-homogeneous pattern of lines of magnetic flux produced by the armature.

DETAILED DESCRIPTION OF THE INVENTION

Figure 3:
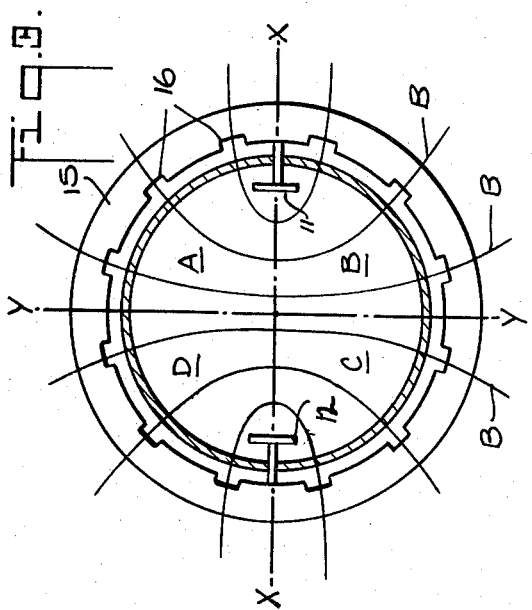
Figure 2:
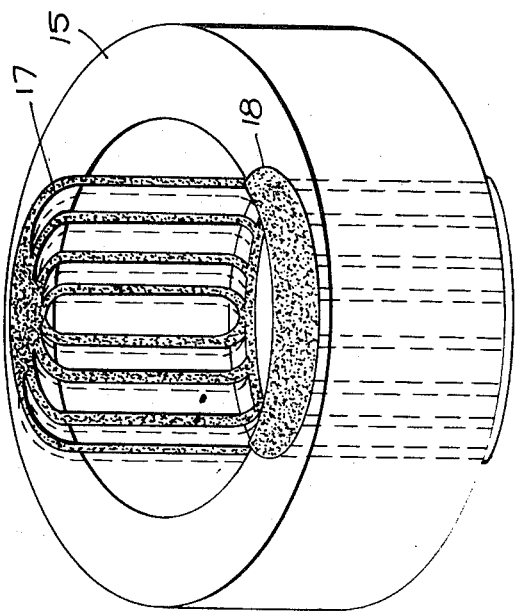
Figure 1:
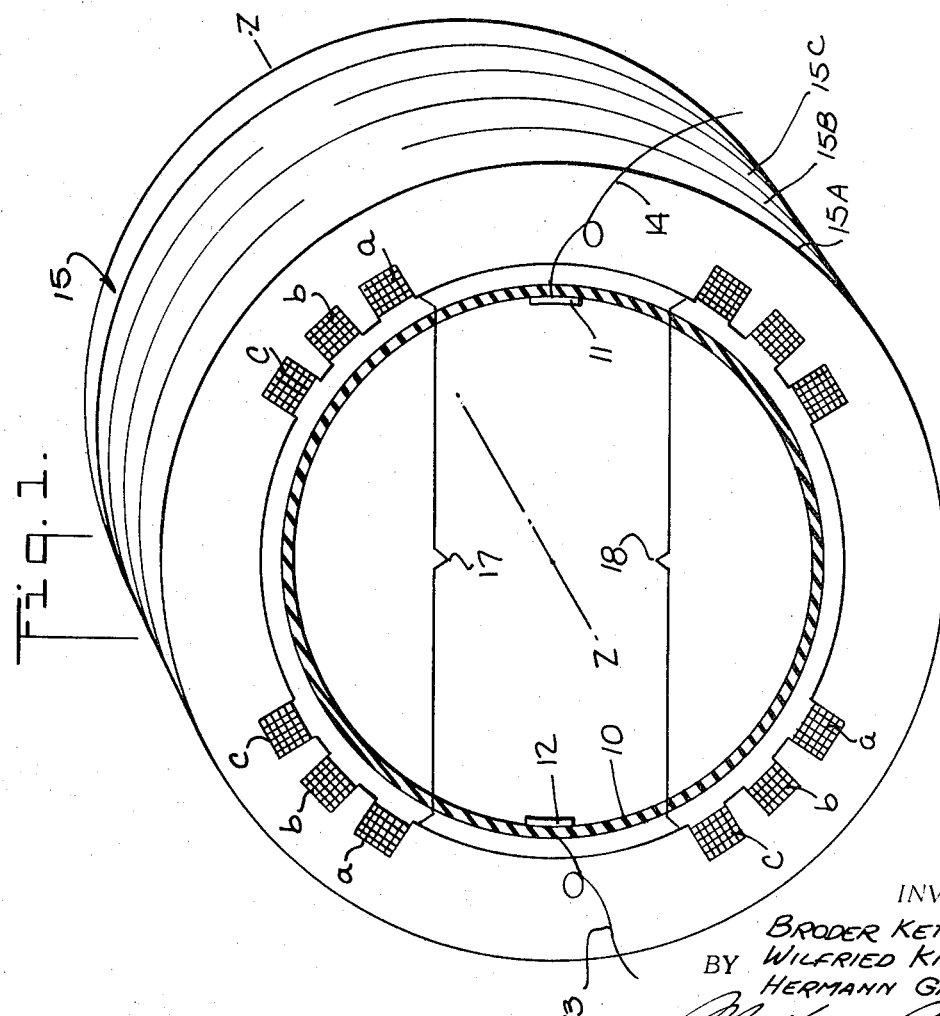

Referring now to the drawing, there is shown a magnetic flowmeter having an armature in accordance with the invention, the meter including a pipe section 10 of circular cross-section, made of non-magnetic material.

Two small disc-shaped electrodes 11 and 12 are mounted at diametrically opposed points in the central portion of pipe section 10. The signal established between these two electrodes is picked up by leads 13 and 14 and applied to an external amplifying circuit. In the pipe section, the fluid to be measured flows in the direction of the longitudinal axis Z which is perpendicular both to the transverse axis X extending between and common to electrodes 11 and 12 and to the axis Y bisecting the pipe section in the vertical plane.

In order to create a non-homogeneous magnetic field normal to flow axis Z, there is provided a cylindrical field armature 15 arranged as tightly as possible about pipe section 10 and symmetrically disposed relative to the electrodes. Armature 15 is constituted by annular laminations 15A, 15B, 15C, etc., the main plane of each lamination being normal to the longitudinal axis Z. Thus the magnetic lines of flux, as indicated by lines B in FIG. 3, enter into and pass through the laminations in the plane thereof, the lines being at right angles to the width of the laminations; that is, to the smallest cross-section of each lamination. Because of this arrangement, local saturations and eddy currents are avoided.

Formed on the laminated armature 15 is any array of longitudinally extending slots 16 which lie in parallel relation to the longitudinal axis Z of the pipe section. The slots are symmetrically arranged with respect to the four quadrants A, B, C and D defined by the X and Y axes, the distribution being such that an equal number of slots a, b and c lie within quadrants A, B, C and D.

Accommodated within the slots of the upper quadrants A and D are the longitudinally extending windings of a field coil 17, while accommodated within the slots of the lower quadrants B and C are the longitudinally extending windings of a second field coil 18. Because of this arrangement wherein the windings lie within the cylindrical armature, heat generated by the energized coils is effectively conducted by the armature to the surrounding area, thereby making possible increased current density and a higher degree of excitation than was feasible with prior arrangements. This effect is further supported by a reduction of the magnetic resistance through the shortest possible flux return path, the arrangement being such as to conserve space.

In the above-identified related copending application, it is pointed out that an optimum signal may be developed at the electrodes when the magnetic lines of flux produced by the field coils intersect the electric lines of flux extending between the electrodes, substantially at right angles thereto. The present arrangement makes it possible to establish a non-homogeneous field which satisfies this requirement. By a proper distribution of the slots and the field coil windings accommodated therein, a desired field line loop in the measurement cross-section can be readily achieved.

While there has been shown a preferred embodiment of magnetic flowmeter having a ferrous field armature in accordance with the invention, it will be appreciated that many changes and modifications may be made therein without, however, departing from the essential spirit thereof.

We claim:

1. A magnetic flowmeter comprising:
   a. a non-magnetic pipe section for conducting a fluid to be measured in the direction of the longitudinal axis of the pipe section,
   B. a pair of electrodes disposed at diametrically opposed points on the inner wall of said pipe section, said electrodes lying on a common transverse axis which passes through said longitudinal axis and intersects an axis bisecting the pipe section at right angles thereto to define four quadrants,
   C. a cylindrical armature encircling the central portion of said pipe section and symmetrically disposed relative to said electrodes, said armature having a plurality of spaced slots extending along the inner wall thereof in parallel relation to said longitudinal axis, said slots being symmetrically distributed with respect to said electrodes, an equal number of slots lying within each quadrant, and
   D. a pair of field coils, the winding of one coil passing through the slots in the quadrants above the transverse axis, the windings of the other coil passing through the slots in the quadrants below the transverse axis, said coils when energized creating a magnetic field which is traversed by said fluid to induce a voltage in said fluid, which voltage is transferred to said electrodes.

2. A flowmeter as set forth in claim 1, wherein said armature is constituted by a stack of annular laminations whose widths lie at right angles to the magnetic lines of flux created by the field coils.

3. A flowmeter as set forth in claim 1, wherein said pipe section has a circular cross-section.

4. A flowmeter as set forth in claim 1, wherein said slots are distributed to create a non-homogeneous magnetic field whose magnetic lines of flux intersect the electric lines of flux extending between the electrodes substantially at right angles thereto.

* * * * *

UNITED STATES PATENT OFFICE
CERTIFICATE OF CORRECTION

Patent No. 3,690,172     Dated September 12, 1972

Inventor(s) Broder Ketelsen and Wilfried Kiene

It is certified that error appears in the above-identified patent and that said Letters Patent are hereby corrected as shown below:

The following statement (page 1 of original specification) is missing from the patent:

"Related Application : This application is related to United States Patent Application of Wilfried Kiene, Serial No. 100,160, filed December 21, 1970 ."

Column 1 , the equation should have read " $E = I/C\ BDV$ "

line 46, 'strength' should have read --magmeter-- line 47, "i.e." should have read -- without -- line 51, "spurious" after the period should not appear.

Next to last line, this line should end in a period (.)

Column 2, line 6, "spurious" is misspelled"

Signed and sealed this 23rd day of January 1973.

(SEAL)
Attest:

EDWARD M. FLETCHER, JR.
Attesting Officer

ROBERT GOTTSCHALK
Commissioner of Patents